United States Patent
Tomioka

(10) Patent No.: US 9,607,747 B2
(45) Date of Patent: Mar. 28, 2017

(54) MAGNETIZATION APPARATUS FOR MAGNET OF MAGNETIC ENCODER AND METHOD THEREOF

(71) Applicant: UCHIYAMA MANUFACTURING CORP., Okayama (JP)

(72) Inventor: Masanori Tomioka, Okayama (JP)

(73) Assignee: Uchiyama Manufacturing Corp., Naka-ku, Okayama-shi, Okayama (JP)

(*) Notice: Subject to any disclaimer, the term of this patent is extended or adjusted under 35 U.S.C. 154(b) by 16 days.

(21) Appl. No.: 14/538,847

(22) Filed: Nov. 12, 2014

(65) Prior Publication Data

US 2015/0130571 A1  May 14, 2015

(30) Foreign Application Priority Data

Nov. 12, 2013  (JP) .................................. 2013-233885

(51) Int. Cl.
*H01F 13/00*  (2006.01)
*G01D 5/245*  (2006.01)
*G01D 5/14*  (2006.01)

(52) U.S. Cl.
CPC .......... *H01F 13/003* (2013.01); *G01D 5/145* (2013.01); *G01D 5/2451* (2013.01)

(58) Field of Classification Search
CPC ..... H01F 13/003; G01D 5/2451; G01D 5/145
See application file for complete search history.

(56) References Cited

U.S. PATENT DOCUMENTS 5,967,669 A    10/1999  Ouchi
6,400,143 B1 *  6/2002  Travostino ........... G01D 5/2457
                                                324/174

(Continued)

FOREIGN PATENT DOCUMENTS

EP  0836020 A2   4/1998
EP  2397821 A1  12/2011

(Continued)

OTHER PUBLICATIONS

JP 2002164213 A—machine translation.*
European Search Report, EPO, Munich, Apr. 20, 2015.

*Primary Examiner* — Mohamad Musleh
(74) *Attorney, Agent, or Firm* — Bacon & Thomas, PLLC

(57) ABSTRACT

A magnetization apparatus for a magnet of a magnetic encoder. The magnetization apparatus is configured to alternately form a positive and a negative magnetization areas by moving a magnetic member along a route penetrating a gap of a magnetization yoke while alternately generating positive and negative magnetic fields in the gap of the magnetization yoke. The magnetization apparatus includes a power supply part configured to supply electric power to a coil wound around the magnetization yoke; an area setting part configured to receive magnetization pattern information specifying arrangement of the magnetization areas relative to the magnetic member; a positional information generation part configured to output positional information of the magnetic member moving along the route; and a control part configured to control the power supply part in such a manner that each portion of the magnetic member corresponding to the magnetization area specified in the magnetization pattern information receives corresponding positive or negative magnetic field based on the positional information outputted from the positional information generation part.

14 Claims, 11 Drawing Sheets

(56) References Cited

U.S. PATENT DOCUMENTS

| | | | |
|---|---|---|---|
| 8,436,705 B2 | 5/2013 | Takahashi | |
| 2001/0030533 A1* | 10/2001 | Iwamoto | G01P 3/443 |
| | | | 324/174 |
| 2006/0001514 A1 | 1/2006 | Seno | |
| 2011/0291780 A1* | 12/2011 | Takahashi | G01D 5/2451 |
| | | | 335/284 |
| 2015/0243427 A1* | 8/2015 | Takahashi | H01F 13/00 |
| | | | 335/284 |

FOREIGN PATENT DOCUMENTS

| | | | | |
|---|---|---|---|---|
| FR | WO 2009041023 A1 * | 4/2009 | | G01D 5/145 |
| FR | WO 2010029742 A1 * | 3/2010 | | F16C 41/007 |
| JP | 4018313 B2 | 9/2001 | | |
| JP | 2002-164213 A | 6/2002 | | |
| SE | FR 2857743 A1 * | 1/2005 | | F16C 41/007 |

* cited by examiner

A

| Area Number | Type | Center Angle |
|---|---|---|
| 1 | N | 67.5° |
| 2 | S | 22.5° |
| 3 | N | 22.5° |
| 4 | S | 22.5° |
| 5 | N | 22.5° |
| 6 | S | 22.5° |
| 7 | N | 22.5° |
| 8 | S | 22.5° |

| Area Number | Type | Center Angle |
|---|---|---|
| 1 | N | 60° |
| 2 | Z | 7.5° |
| 3 | S | 20° |
| 4 | Z | 2.5° |
| 5 | N | 20° |
| 6 | Z | 2.5° |
| 7 | S | 20° |
| 8 | Z | 2.5° |

| Area Number | Type | Center Angle | Magnetization Rate |
|---|---|---|---|
| 1 | N | 67.5° | 90% |
| 2 | S | 22.5° | 90% |
| 3 | N | 22.5° | 90% |
| 4 | S | 22.5° | 90% |
*Fig. 7a*
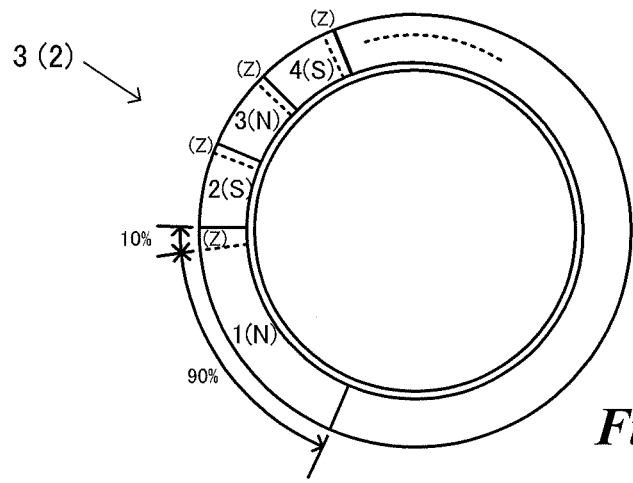
*Fig. 7b*
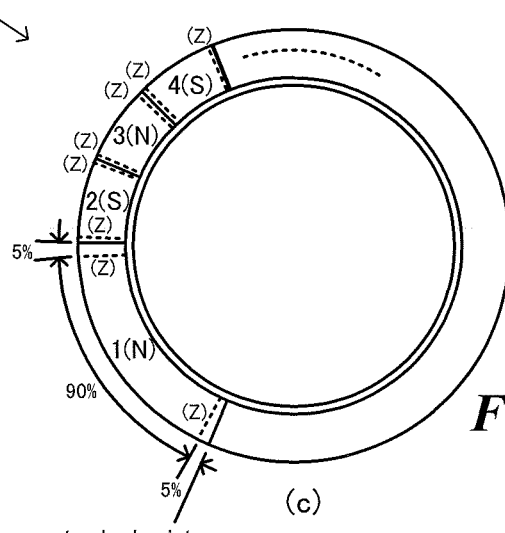
*Fig. 7c*

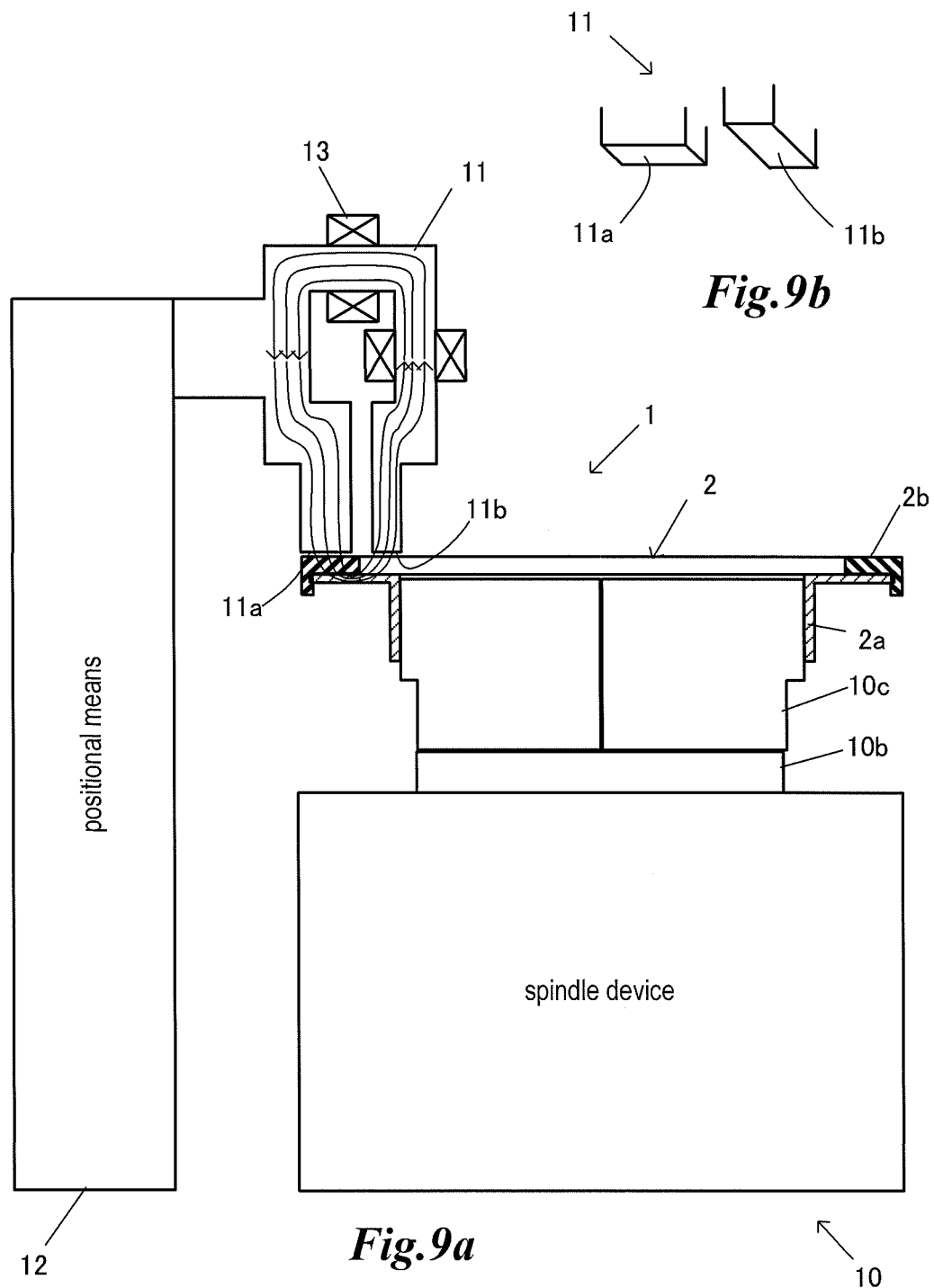

MAGNETIZATION APPARATUS FOR MAGNET OF MAGNETIC ENCODER AND METHOD THEREOF

TECHNICAL FIELD

The present invention relates to a magnetization apparatus for a magnet of a magnetic encoder and to a method thereof.

BACKGROUND ART

A magnetization method using a multi-pole magnetization yoke has been well-known as a method for magnetizing a multi-pole magnet of a magnetic rotary encoder.

FIG. 10 shows one embodiment of a conventional multi-pole magnetization yoke. A multi-pole magnetization yoke 110 magnetizes eight poles (N and S poles) on the circumferential face of an annular magnetic member 2. Eight magnetization projections 110a are circumferentially provided on a base part 110b. A coil for generating a magnetic field from each magnetization projection 110a is wound around the multi-pole magnetization yoke 110 (not shown in the figure). Electric current is supplied to the coil after positioning the magnetic member 2 relative to the multi-pole magnetization yoke 110, thereby the magnetic member 2 is simultaneously magnetized into eight poles.

In another magnetization method, the following Patent Literatures 1 and 2 disclose a rotary magnetization method in which the positive and the negative magnetic fields is alternately generated from a magnetization yoke for locally magnetizing an annular magnetic member, the magnetic member is rotationally moved relative to the magnetization yoke, and the N-poles and the S-poles are alternately formed on the magnetic member.

CITATION LIST

Patent Literature

[PTL 1] Japanese Patent No. 4018313
[PTL 2] JP-A-2002-164213

SUMMARY OF INVENTION

Technical Problem

The above-mentioned magnetization method using the multi-pole magnetization yoke is suitable for mass production. Corresponding relation of arrangement of the magnetization projections of the multi-pole magnetization yoke and arrangement of the N-poles and the S-poles of the magnetized multi-pole magnet is fixed, so that a multi-pole magnetization yoke is required to be prepared for each magnet for obtaining variety of multi-pole magnets with different arrangement of the N-poles and the S-poles.

The rotary type magnetization method disclosed in Patent Literatures 1 and 2 does not propose a magnetization method for a magnetic member with a desired magnetization pattern.

The present invention has an object to magnetize the magnetic member with a desired magnetization pattern in the rotary magnetization apparatus for the magnet of the magnetic encoder and the method thereof.

Solution to Problem

In a magnetization apparatus for a magnet of a magnetic encoder of one embodiment of the present invention, the magnetization apparatus is configured to alternately form a positive and a negative magnetization areas by moving a magnetic member along a route penetrating a gap of a magnetization yoke while alternately generating positive and negative magnetic fields in the gap of the magnetization yoke. The magnetization apparatus comprises a power supply part configured to supply electric power to a coil wound around the magnetization yoke; an area setting part configured to receive magnetization pattern information specifying arrangement of the magnetization areas relative to the magnetic member; a positional information generation part configured to output positional information of the magnetic member moving along the route; and a control part configured to control the power supply part in such a manner that each portion of the magnetic member corresponding to the magnetization area specified in the magnetization pattern information receives corresponding positive or negative magnetic field based on the positional information outputted from the positional information generation part.

The magnetization pattern information can specify arrangement of a non-magnetization area in addition to the positive and the negative magnetization areas.

The magnetization pattern information can specify arrangement of the positive and the negative magnetization areas, each including the non-magnetization area, and the magnetization pattern information can specify ratio of the non-magnetization area in each magnetization area.

In addition, the magnetization pattern information can specify the lowest value for the ratio of the non-magnetization area.

The control part can control at least one of generation time and strength of the magnetic field in each magnetization area of which arrangement is specified in the magnetization pattern information.

The power supply part can supply positive or negative electric current pulse, and the control part can control the number of supply times of the electric current pulse per magnetization area specified in the magnetization pattern information.

The magnetic member can be annular with a predetermined length in the circumferential direction and movement along the route can be rotation with the central axis of the magnetic member fixed.

In a method for magnetizing a magnet of a magnetic encoder of one embodiment of the present invention, a positive and a negative magnetization areas are formed alternately by moving a magnetic member along a route penetrating a gap of a magnetization yoke while alternately generating a positive and a negative magnetic fields in the gap of the magnetization yoke. The method comprising the steps of receiving in advance magnetization pattern information specifying arrangement of the positive and negative magnetization areas relative to the magnetic member; determining in real time position of the magnetic member moving along the route; and generating a magnetic field in the gap of the magnetization yoke in such a manner that each portion of the magnetic member corresponding to the magnetization area specified in the magnetization pattern information receives corresponding positive or negative magnetic field based on the positional information outputted from the positional information generation part.

Advantageous Effects of Invention

In the embodiments of the present invention, receiving magnetization pattern information specifying arrangement of desired magnetization areas, the magnetic member is magnetized based on the information. Namely, the magnetization pattern for the magnetic member is programmable. Regular-pitch magnetization of which pitch is freely specified and irregular-pitch magnetization in which width of the magnetization area is freely specified are possible without modifying the apparatus structure by exchanging members. Therefore, one apparatus is able to be used for various magnetization patterns. When the magnetization pattern information is capable of specifying arrangement of a non-magnetization area in addition to the positive and the negative magnetization areas, a magnet outputting a desired wave-shape as the detection signal of the magnetic sensor is obtained.

BRIEF DESCRIPTION OF DRAWINGS

FIG. 3Aa to FIG. 3Ac show plan views of another embodiment of the magnet magnetized by the similar procedures to FIG. 3a and FIG. 3b.

FIG. 7a is a table showing another example of the magnetization pattern information. FIG. 7b and FIG. 7c are plan views showing the magnetization area formed on the basis of the information, respectively.

FIG. 9a is a partial side view of the magnetization apparatus in which both end faces of the magnetized yoke are provided on the surface side of the magnetic member, and FIG. 9b is a perspective view of the end faces of the magnetization yoke of the magnetization apparatus.

DESCRIPTION OF EMBODIMENTS

The magnetization apparatus for a magnet of a magnetic encoder of one embodiment of the present invention is configured to alternately form the positive and the negative magnetization areas by moving a magnetic member with a predetermined length along a route penetrating a gap of a magnetization yoke while alternately generating magnetic fields in the positive and the negative directions in the gap of the magnetization yoke being fixed and held. The above-mentioned length of the magnetic member relates to the moving route of the magnetic member.

The present invention is improved in such a manner that the magnetization apparatus receives magnetization pattern information specifying arrangement of desired magnetization areas and magnetizes the magnetic member based on the information. In the magnetization apparatus of the embodiment of the present invention, the magnetization pattern relative to the magnetic member is programmable. A magnetization apparatus for a magnet of a magnetic rotary encoder is explained as follows as an example of the basic embodiment.

Figure 1:
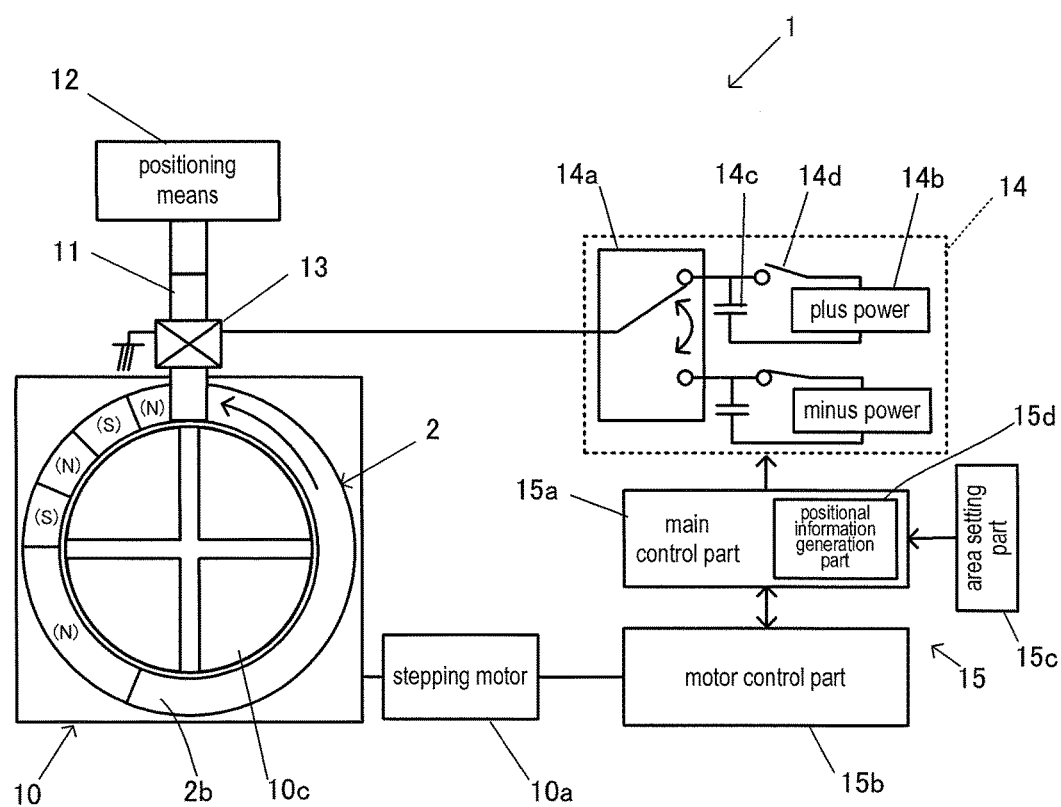
FIG. 1 is a diagrammatic plan view of the magnetization apparatus showing a basic embodiment.
Figures 2A, 2B:
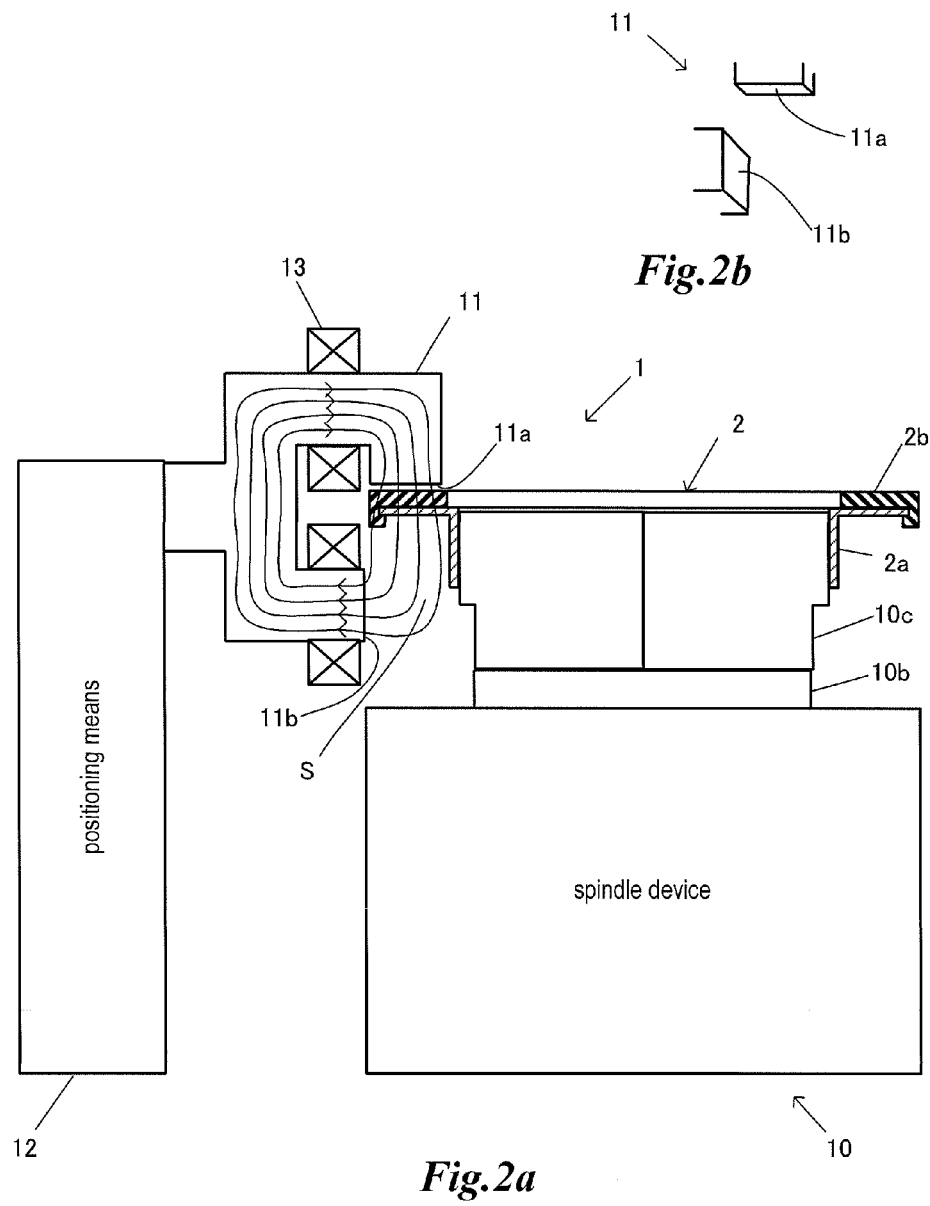
FIG. 2a is a partial sectional view of the magnetization apparatus of FIG. 1
FIG. 2b is a perspective view of end faces of the magnetization yoke.

FIG. 1 is a diagrammatic plan view of the magnetization apparatus showing the above-mentioned magnetization apparatus. FIG. 2a is a partial side view of the magnetization apparatus and FIG. 2b is a perspective view of the end faces of the magnetization yoke of the magnetization apparatus. The scale in FIG. 2 is different from that of FIG. 1 for easy understanding.

The magnetic member 2 to be magnetized is annular with a predetermined circumferential length and is formed by fixing a hard magnetic ring 2b to a face of a flange extending outside from one end of a tubular core member 2a made of soft magnetic metal.

The tubular core member 2a is made of soft magnetic metal such as SUS430 or SPCC. When the shape and so on of the magnetization yoke 11 are devised, non-magnetic metal such as aluminum alloy, brass or SUS304 can be used.

The magnetic ring 2b is made of molded resin material including hard magnetic powder such as alnico, neodymium, samarium, ferrite or is made of sintered material of hard magnetic body. When the magnetic encoder is used for a vehicle, the magnetic ring with high Curie temperature and shock resistance is preferable. The fixing method of the tubular core member 2a and the magnetic ring 2b is not limited.

The magnetization apparatus 1 has a mechanical part and a circuit part including a power supply part 14 and a control part 15, the mechanical part comprising a spindle device 10 rotationally moving the magnetic member 2 and the magnetization yoke 11 generating a magnetic field, as shown in the figure.

The spindle device 10 uses a stepping motor 10a as a driving source, transmits the power with a power transmission mechanism, not shown in the figure, provided in the device 10 and rotates a base 10b. The stepping motor 10a incorporates an encoder outputting pulse showing the speed and pulse of origin, not shown in the figure. The base 10b is provided with a chuck 10c for holding the magnetic member 2. The chuck 10c comprises plural movable pieces in the shape of quartered cylinder and is configured to hold or release the magnetic member 2 from inside by moving the movable pieces in the expanding or contracting diametrical direction. The driving source is not limited to the stepping motor 10a and any driving source can be used as long as the rotary speed is accurately controlled and measured.

The magnetization yoke 11 is formed like the letter "C" including a gap S and is made of soft magnetic metal such as iron, permalloy, permendur or SS400. The magnetization yoke can be molded by compressing soft magnetic powder such as sendust.

The shape and the dimension of the gap S of the magnetization yoke 11 are appropriately determined corresponding to the sectional shape of the magnetic member 2. Basically, any shape and dimension can be applied to the gap S as long as each portion of the magnetic member 2 penetrates and passes through the gap S in a non-contact condition.

The opposite side of the magnetization yoke 11 to the gap S is coupled with the positioning means 12 so as to position the magnetization yoke 11 relative to the magnetic member 2 held with the spindle device 10. The mechanism and the structure of the positioning means 12 are not limited. Position of the magnetization yoke 11 is preferably positioned in the diametrical direction of the magnetic member 2 by at least one-axis degree-of-freedom. Preferably, the magnetization yoke 11 is positioned in any direction by two-axis or three-axis degree-of-freedom. The magnetization yoke 11 is able to magnetize magnetic members of different sizes when being designed to be capable of freely positioning.

A coil 13 made of a copper wire is wound around the magnetization yoke 11 except for the gap S and the connection to the positioning means 12. The number of winding and the number of coils 13 are not limited.

The shapes of an end face 11a and an end face 11b of the magnetization yoke 11 can be modified on request as shown in FIG. 2b. The end face 11a facing the magnetic member 2 can be formed rectangular in which the side along the moving direction of the magnetic member 2 is short; the end face 11b can be formed square in which four sides of the end face 11b are shorter than the longer side of the end face 11a and longer than the shorter side of the end face 11a. The end face 11a facing the magnetic member 2 can be formed such that the side along the movement of the magnetic member 2 is short; the end face 11b can be rectangular with sides longer than the longer side of the end face 11a.

The power supply part 14 supplies electric power to the coil 13 wound around the magnetization yoke 11. The power supply part 14 is configured to selectively supply at least positive or negative electric current in order to generate a positive or negative magnetic field in the gap S of the magnetization yoke 11.

The power supply part 14 requires supplying large amount of electric current to the coil 13. The power supply part 14 constituted with a DC power source requires much cost, so that a condenser-type power source is usually used.

In the condenser-type power source in the figure, a condenser 14c is charged from a power supply circuit 14b while interrupting connection with the coil 13 by a selection switch 14a. The condenser 14c is blocked off from the power supply circuit 14b by a charge switch 14d when the condenser 14c is fully charged. Then a large amount of electric current (current pulse) is discharged at once from the condenser 14c to the coil 13 by switching the selection switch 14a. The power supply part 14 has two power sources of plus and minus and selectively supplies positive or negative current pulse. The number of current pulse supplied per unit time has the upper limit because the condenser 14c needs charge time.

The control part 15 comprises a main control part 15a controlling the power supply part 14 and a motor control part 15b controlling the driving source of the spindle device 10.

The main control part 15a has an area setting part 15c receiving magnetization pattern information specifying arrangement of desired magnetization areas relative to the magnetic member 2 and has a positional information generation part 15d determining and outputting positional information of the magnetic member 2 moving on the route at a constant speed. The main control part 15a controls the power supply part 14 based on the positional information outputted from the positional information generation part 15d as a basic operation in such a manner that each portion of the magnetic member 2 corresponding to the magnetization area of which arrangement is specified in the magnetization pattern information receives the positive or negative magnetic field. Namely, the main control part 15a compares the positional information with the magnetization pattern information and controls the corresponding power supply part 14 so as to generate the positive or the negative magnetic field based on the magnetization area corresponding to the positional information.

The magnetization pattern information is for specifying the magnetization area in the positive or the forward direction, namely arrangement of the N-pole and the S-pole when the magnetic member 2 is seen from the front side (it can be seen from the back side). The magnetic member 2 is a magnet of the magnetic encoder, so that the N-poles and the S-poles are alternately arranged on the surface of the magnetic member 2. The embodiment of the present invention allows arrangement of the N-poles and the S-poles at an irregular pitch in addition to that at an equal pitch. The format of the magnetization pattern information is not limited; however, enough information is required to specify the type, the start point and the end point of the magnetization area.

The structure of the area setting part 15c is not limited as long as the area setting part 15c has a function of receiving the magnetization pattern information via any medium. For example, the magnetization pattern information produced by an information terminal such as a work station can be received via a serial cable. Or the magnetization pattern information can be received from a remote location when the area setting part 15c is constituted as a network communication device. Or the magnetization pattern information stored in a CD disk, a memory card, or a USB memory can be read out when the area setting part 15c is constituted as a memory medium reading device.

The area setting part 15c registers the received magnetization pattern information in a memory (not shown in the figure). It is desirable that the area setting part 15c is capable of registering plural pieces of magnetization pattern information and is capable of selecting one of them by a predetermined operation.

The positional information generation part 15d has a function of outputting the positional information of the magnetic member 2 on the route. Any positional information can be used as long as a portion of the magnetic member 2 existing in the gap S of the magnetization yoke 11 at each time is specified.

In this embodiment, the positional information is generated based on the pulse of the moving speed and the pulse of the original signal of the magnetic member 2. Namely, a portion of the magnetic member 2 passing through the gap S of the magnetization yoke 11 is able to be calculated in real time based on the elapse of the time after receiving the original signal and on the moving speed history of the magnetic member 2.

In this embodiment, the magnetic member 2 is annular and each portion of the magnetic member 2 is considered to be the same. Therefore, any portion of the magnetic member 2 can be the top thereof. Time-keeping is started at the time of receiving the pulse of the original signal or at the time when a predetermined time elapses after receiving the pulse of the original signal. The positional information can be shown by a rotary angle from a standard position to the portion of the magnetic member 2 passing through the gap S of the magnetization yoke 11, the standard position being the portion of the magnetic member 2 when the magnetic member 2 has passed through the gap S of the magnetization yoke 11 at the time of starting time-keeping.

The motor control part 15b is a control circuit of the driving source of the spindle device 10. Two control manners of the main control part 15a are possible; namely, the main control part 15a controls the driving source via the motor control part 15b or the motor control part 15b independently controls the driving source.

In the former manner above, the main control part 15a generates control pulse for rotating the stepping motor 10a at a constant speed and the motor control part 15b rotates the stepping motor 10a step by step each time the control pulse is received. The positional information generation part 15d measures time by counting the control pulse and calculates positional information based on the measured time.

In the latter manner above, the motor control part 15b independently controls the stepping motor 10a to rotate at a constant speed and informs the main control part 15a each time the stepping motor 10a is rotated at a predetermined step. The positional information generation part 15d measures time by counting the informing signal and calculates positional information based on the measured time.

In basic operation of the magnetization apparatus 1, the magnetic member 2 is fixed to the chuck 10c by manpower or an automatic conveying apparatus (not shown in the figure). Then, the main control part 15a or the motor control part 15b increases the rotary speed of the magnetic member 2 upto a constant rotary speed by controlling the driving source of the spindle device 10.

When the magnetic member 2 reaches a constant rotary speed, the main control part 15a controls electric power supply to the coil 13 and magnetization is executed. The main control part 15a determines the magnetization area specified in the magnetization pattern information in which the portion of the magnetic member 2 passing through the gap S of the magnetization yoke 11 is included, based on the positional information outputted from the positional information generation part 15d every unit time, thereby controlling the power supply part 14. The magnetization process is finished after the magnetic member 2 rotates at least once. However, the magnetization process can be finished after the magnetic member 2 rotates twice or above. The magnetic member 2 becomes a multi-pole magnet of a magnetic encoder by such a magnetization process.

In a condition that the magnetic member 2 moves at a constant speed, for enabling magnetization at an irregular pitch, generation time of the magnetic field is controlled per magnetization area of which arrangement is specified in the magnetization pattern information. The larger the magnetization area of which arrangement is specified in the magnetization pattern information is, the longer the generation time of the magnetic field is. The smaller the magnetization area of which arrangement is specified in the magnetization pattern information, the shorter the main control part 15a controls the generation time of the magnetic field. For example, if the current pulse supplied by the power supply part 14 is constant, the supply time of the current pulse varies per magnetization area of which arrangement is specified in the magnetization pattern information.

Based on the similar consideration, when the power supply part 14 is a commonly used DC power source and supplies constant current, supply time of electric current is controlled per magnetization area of which arrangement is specified in the magnetization pattern information.

When the power supply part 14 is able to dynamically control electric current, magnitude of electric current can be controlled per magnetization area of which arrangement is specified in the magnetization pattern information. The intensity of the magnetic field is changed by such a control. When the intensity of the magnetic field is high, width of the magnetic field in the gap S of the magnetization yoke 11 is enlarged. Therefore, the width of the area can be controlled by changing the intensity of the magnetic field.

In this embodiment, the magnetization apparatus is constituted as mentioned above and the magnetization pattern is programmable. The magnetization is able to be executed for the magnetic members of various sizes without modifying the apparatus structure and exchanging parts both at a regular pitch in which pitch is freely set and at an irregular pitch in which the width of each magnetization area is freely specified. Therefore, one magnetization apparatus is able to be used for various magnets.

The basic example of the magnetization process of the magnetization apparatus is explained as follows.

Figures 3A, 3B:
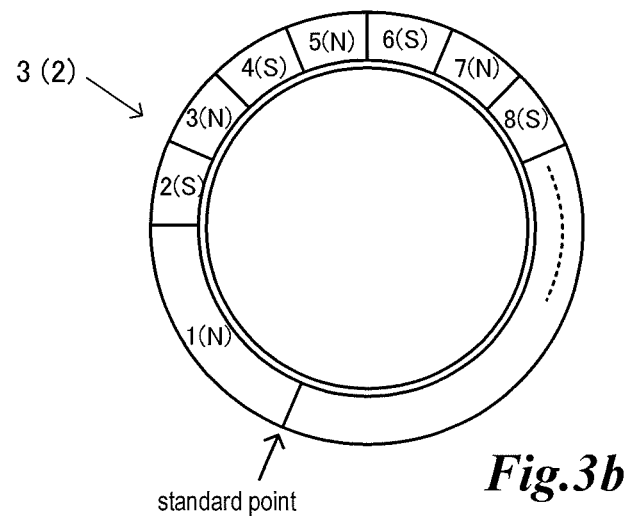
FIG. 3a is a table showing one example of the magnetization pattern information and FIG. 3b is a plan view showing the magnetization area formed on the basis of the information.
Figure 3A:
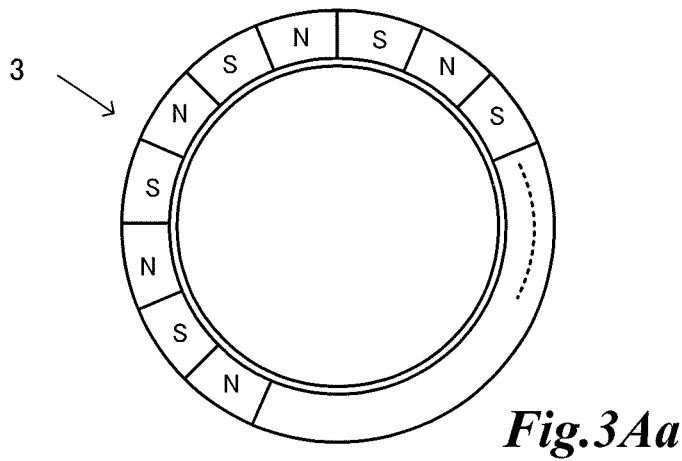
Figure 3A:
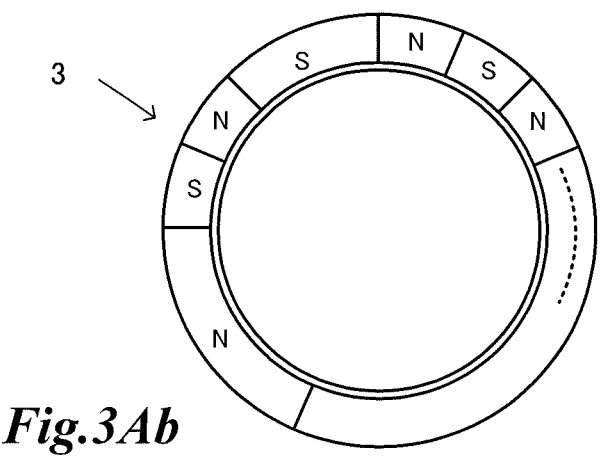
Figure 3A:
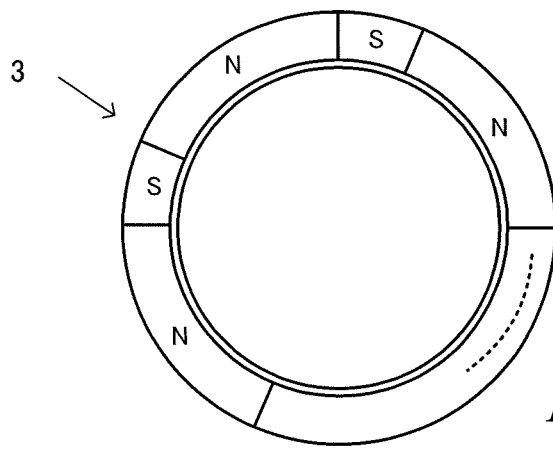

FIG. 3a is a table showing one example of the magnetization pattern information and FIG. 3b is a plan view showing the magnetization area formed on the basis of the information.

In the magnetization pattern information A, for specifying arrangement of the magnetization areas, the area number, the magnetization type (positive direction: N-pole, negative direction: S-pole), and the center angle (width of the area) of each magnetization area are specified and associated. In this embodiment, the area number and the magnetization type are specified in advance and a magnetization area is able to be specified for each area number. For example, the area number 1 is specified by the type of the N-pole and the center angle of 67.5 degrees. The area number 2 is specified by the type of the S-pole and the center angle of 22.5 degrees. The magnetization pattern is one example in case of the irregular pitch and the area number 1 is specified to be wider than the other areas. The irregular pitch is not limited as mentioned above and any number of the areas and any center angle can be specified.

The magnet 3 magnetized by the magnetization pattern information A is formed with the area number 1 and the area number 2 in order, from the portion of the magnetic member 2, i.e. a standard point, at the gap S of the magnetization yoke 11 at the start of magnetization. For example, the area number 1 is magnetized to be the N-pole and the center angle is 67.5 degrees and the area number 2 is magnetized to be the S-pole and the center angle is 22.5 degrees (The area of which surface side is magnetized to be the N-pole is called the N-pole and the area of which surface side is magnetized to be the S-pole is called the S-pole).

FIG. 3Aa to FIG. 3Ac show plan views of another embodiment of the magnet magnetized by the procedures mentioned above.

In FIG. 3Aa, the magnet 3 is magnetized by alternately arranging the N-poles and the S-poles with a constant width. In FIG. 3Ab, the magnet 3 is magnetized by alternately arranging the N-poles and the S-poles with an irregular width. In FIG. 3Ac, the magnet 3 is magnetized by alternately arranging wide N-poles and narrow S-poles. The arrangements of the magnetization areas specified in the magnetization pattern information A are different in the above figures; however, the same magnetization process is executed for the magnet 3. Namely, in the embodiment of the present invention, when the arrangement of the desired magnetization areas is specified in the magnetization pattern information A, the magnet 3 corresponding to the specified arrangement is obtained.

The principle of the magnetic encoder using the magnet magnetized as mentioned above is explained as follows.

Figure 4A:
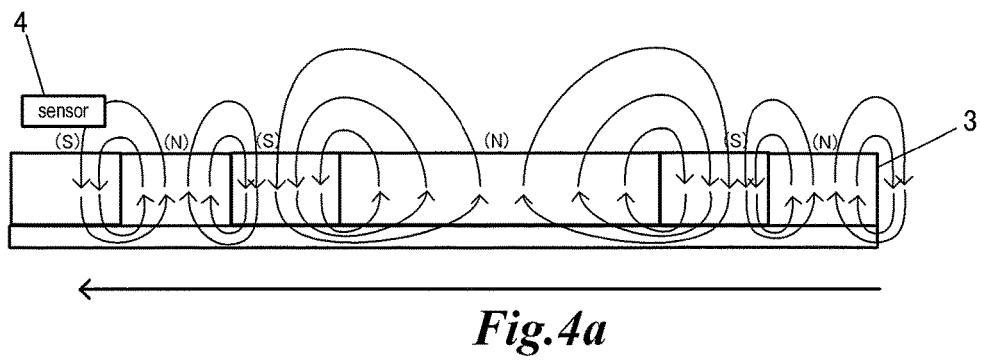
FIG. 4a is a partial side view of the magnetic encoder.
Figure 4B:
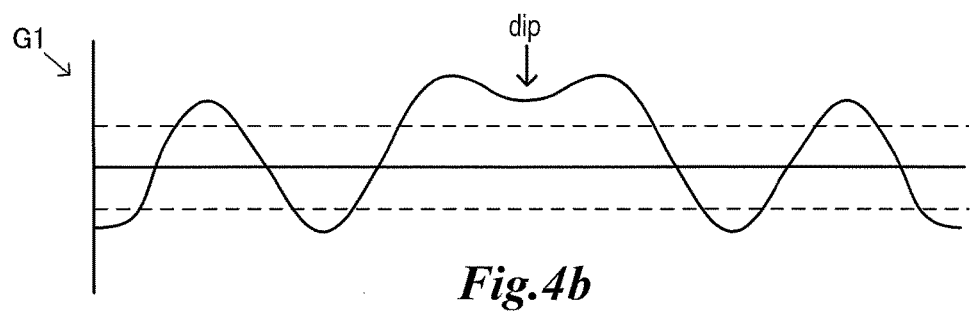
FIG. 4b is a graph showing time change of the detection signal of the magnetic sensor.
Figure 4C:
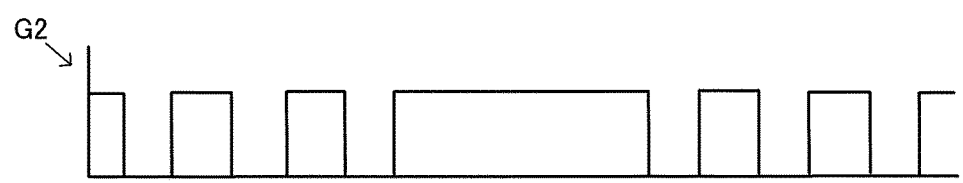
FIG. 4c is a graph in which the detection signal of the magnetic sensor is digitalized.

FIG. 4a is a partial side view of the magnetic encoder comprising the magnet magnetized at an irregular pitch and the magnetic sensor, FIG. 4b is a graph showing time change of the detection signal of the magnetic sensor, and FIG. 4c is a graph in which the detection signal of the magnetic sensor is digitalized.

The magnetic member 2, i.e. the magnet 3 in the figure, is annular as mentioned above; however, the magnet 3 is shown linearly for easy understanding. The magnetic sensor 4 is fixed relative to the center axis of the magnet 3 so as to have a predetermined distance from the surface of the magnet 3 and the magnet 3 is freely rotated with the center axis fixed. In the figure, the magnet 3 moves in parallel along the arrow. Hall element and MR element can be used for the magnetic sensor 4; however, the magnetic sensor 4 capable of detecting the vertical component of the intensity of the magnetic field (in the upward direction in the figure) is used in this embodiment. Namely, the magnetic sensor 4 outputs a detection signal in which the vertical component of the magnetic field is a positive value and the component in the reverse direction is a negative value.

The magnetic field generated by the magnet 3 is shown with magnetic force lines in the figure.

On the surface side of the magnet 3, the magnetic force lines upwardly penetrating the N-poles are diverged right and left in the vicinity of the surface of the magnet 3, are reversed downwardly and become the magnetic force lines penetrating downwardly the S-poles on both sides because the S-poles are provided close to both sides of the N-pole. The magnetic force lines are parallel to the surface of the magnet 3 around the boundary of the N-pole and the S-pole. The N-pole at the center is wide and the S-poles are provided adjacent to both sides, so that the density of the magnetic force lines is low above the area where the magnetic force lines are diverged right and left. On the backside of the magnet 3, the magnetic force lines pass through the tubular core member 2a made of soft magnetic metal.

When the magnet 3 with such a magnetic field moves relative to the magnetic sensor 4, the magnetic sensor 4 outputs a detection signal as shown in the graph G1 of FIG. 4b in which the horizontal axis of the graph G1 shows time. The horizontal position and scale of the graph G1 are arranged so as to contrast with the side view of the magnetic member 2 in FIG. 4a. For example, the peak on the left end in the graph G1 is formed by the magnetic force lines downwardly penetrating the magnetization area of the S-pole directly under the magnetic sensor 4. Other peaks are formed in the same manner.

The zero-cross point of the graph G1 is where the magnetic force lines are horizontal in FIG. 4a, namely in the vicinity of the boundary of the N-pole and the S-pole. In the wide N-poles at the center the density of the magnetic force lines is low above the center, so that a dip is shown at the center of the corresponding peak to the graph G1.

In general utilization for calculating the rotary speed after digitalizing the detection signal of the magnetic encoder, a computer is not able to directly process the analog signal shown in FIG. 4b. Therefore, the analog signal is required to be digitalized in advance, binary digitalization being sufficient in general. For example, in a simple binary digitalization, the threshold on the plus side and that on the minus side are applied to a series of analog values and the portion exceeding any threshold is determined 1 and the portion not exceeding any threshold is determined 0. The thresholds are shown with dotted lines in the figure.

FIG. 4c is a graph showing that the detection signal shown in FIG. 4b is digitalized in binary. The horizontal position and the scale in the graph G2 are arranged in the same manner as that in FIG. 4b. The digitalized detection signal is pulse of 1 or 0 and loses information of plus or minus.

However, the position and width of the peak in graph G1 in FIG. 4b are able to be obtained.

The magnetic member 2 in this embodiment is formed in such a manner that the N-pole at the center is greater in width than other N-poles and the S-poles. A computer is able to distinguish the long pulse corresponding to the wide N-pole from the short pulse corresponding to other N-poles and S-poles. When the number of the continuous short pulse is counted from the position of the long pulse, the rotary speed of the magnet 3 and the absolute rotary angle are able to be calculated. The magnet 3 in this embodiment is formed with one special N-pole so that the rotary direction is not detected. If a plurality of special N-poles and S-poles with different width from that of other poles are formed, the rotary direction is able to be detected.

Generally, the magnetic power of a magnet deteriorates at high temperature. For example, the magnetic power of a ferrite magnet becomes about 94% at 50 degrees centigrade and about 84% at 100 degrees centigrade compared with the magnetic power at 20 degrees centigrade. Once the magnetic force of a neodymium magnet reduces, the magnetic force sometimes does not recover completely even when temperature of the magnet returns to be low. When the above-mentioned magnetic encoder is used for a long time at a high temperature condition, it should be taken into consideration that the magnetic force of the magnet 3 may reduce and the following disadvantage may occur.

When the peak of the detection signal being a start position has the dip at the center as shown in the graph G2 in FIG. 4b, all of the detection signal reduces as the magnetic force of the magnet 3 reduces. Therefore, the peak may be converted to two short pulses, other than one long pulse, by the binary digitalization. In such a case, the computer is not able to execute normal process.

A desirable embodiment is explained based on the drawings in order to provide a magnet which does not cause such disadvantages.

Figure 5:
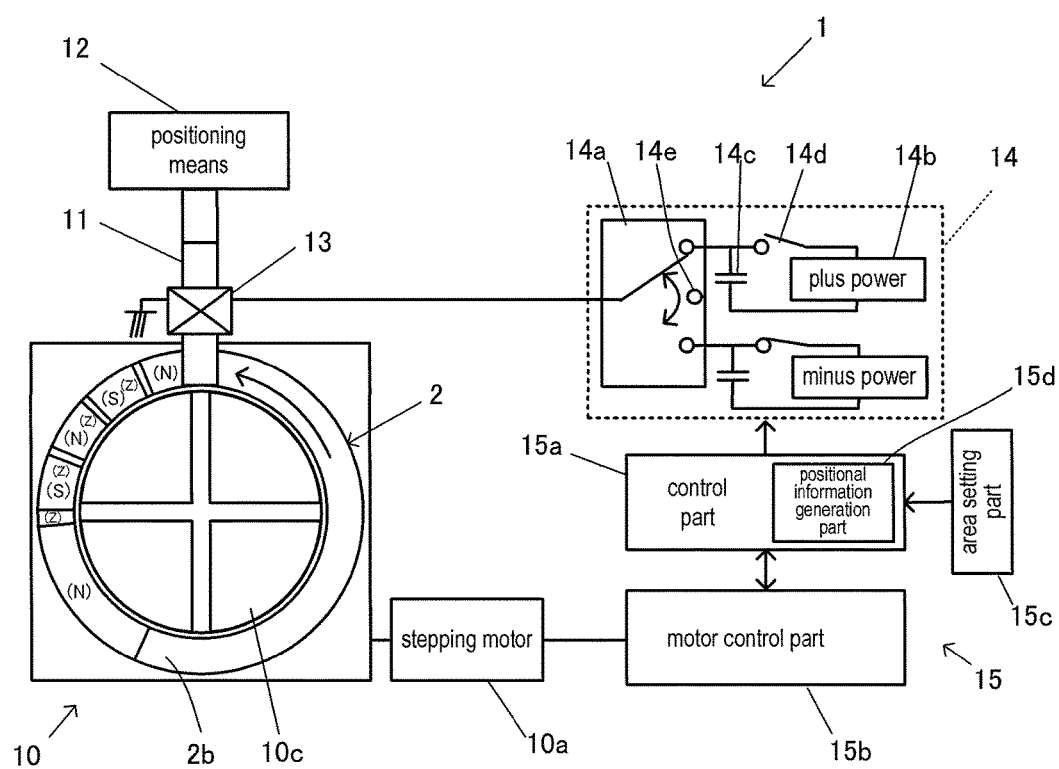
FIG. 5 is a diagrammatic plan view of the magnetization apparatus showing a desirable embodiment.

FIG. 5 is a diagrammatic plan view showing a magnetization apparatus as a desirable embodiment. The elements in common with those of FIG. 1 have the same reference numerals and the explanation is omitted here.

In dealing with the above-mentioned problems, the magnetization apparatus 1 receives the magnetization pattern information specifying arrangement of a non-magnetization area and the positive and negative magnetization areas, and magnetizes the magnetic member 2 based on the information. The non-magnetization area is basically specified at the boundary adjacent to the magnetization areas.

The non-magnetization area is preferably specified in the magnetization pattern information similar to the positive and the negative magnetization areas. The areas are specified to be arranged in the order of the positive magnetization area, the non-magnetization area, the negative magnetization area, and the non-magnetization area. Or the magnetization pattern information may specify arrangement of the positive and the negative magnetization areas including the non-magnetization area, respectively, and may specify the rate of the non-magnetization area in each magnetization area. In such a case, the lowest limit can be set for the rate of the non-magnetization area and the non-magnetization area can be always formed at the boundary of the positive and the negative magnetization areas. In either case, the magnetization pattern information includes enough information for specifying the type; the start point and the end point of each magnetization area; the start point and the endpoint of the non-magnetization area.

The non-magnetization area is formed by providing a time period which does not generate the magnetic field while the corresponding portion of the magnetic member 2 receives the positive or the negative magnetic field for forming the positive or the negative magnetization area. The width of the non-magnetization area is determined depending on the period which does not generate the magnetic field. When the non-magnetization area is thus formed, the magnetic member 2 is desirably demagnetized by heating beyond Curie temperature.

The selection switch 14a of the power supply part 14 further has a non-wired contact point 14d so as to provide the above-mentioned period which does not generate the magnetic field. The power supply part 14 is able to selectively output positive or negative current or output no current by the non-wired contact point 14d. The power supply part 14 of a condenser-type power source is operated so as to interpose a currentless condition when the current pulse is switched from the positive direction to the negative direction like a comb without some teeth.

The area setting part 15c can give an error alarm to the magnetization pattern information of which arrangement does not specify the non-magnetization area at the boundary of the positive and the negative magnetization areas, and may not receive the magnetization pattern information.

The main control part 15a determines whether the magnetization pattern information received in the area setting part 15c includes the arrangement specifying the non-magnetization area. When the magnetization pattern information includes the arrangement specifying the non-magnetization area, the main control part 15a controls the power supply part 14 based on the positional information outputted from the positional information generation part 15d in such a manner that each portion of the magnetic member 2 corresponding to the magnetization area of which arrangement is specified in the magnetization pattern information receives corresponding positive or negative magnetic field, respectively. The main control part 15a controls the power supply part 14 in such a manner that each portion of the magnetic member 2 corresponding to the non-magnetization area does not receive the magnetic field. When the magnetization pattern information does not include arrangement specifying the non-magnetization area, the embodiment is similar to the above-mentioned basic embodiment.

An example of the magnetization process of the magnetization apparatus 1 is explained as follows.

Figures 6A, 6B:
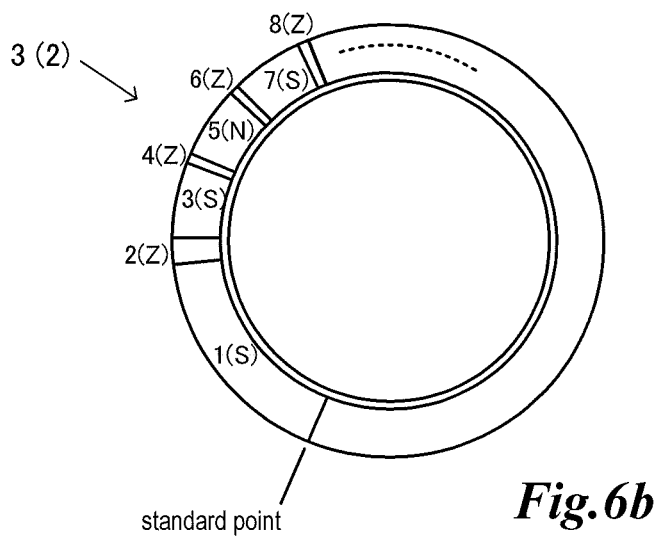
FIG. 6a is a table showing another example of the magnetization pattern information and FIG. 6b is a plan view showing the magnetization area formed on the basis of the information.

FIG. 6a is a table showing another example of the magnetization pattern information and FIG. 6b is a plan view showing the magnetization area formed on the magnetic member based on the information.

For specifying arrangement of the magnetization areas, the magnetization pattern information A specifies the area number, the magnetization type (positive direction: N-pole, negative direction: S-pole, non-magnetization: Z), and the center angle of the magnetization area. For example, the area number 1 is specified by the type of the N-pole and the center angle of 60 degrees. The area number 2 is specified by the type of the non-magnetization area and the center angle of 7.5 degrees. The area number 3 is specified by the type of the S-pole and the center angle of 20 degrees.

The magnet 3 magnetized by the above-mentioned magnetization pattern information A is formed with the area number 1, the area number 2 and the area number 3 in order, from the portion, i.e. a standard point, of the magnet 3 positioned at the gap S of the magnetization yoke 11 at the start of magnetization. For example, the area number 1 is magnetized to be the N-pole and the center angle is 60 degrees, the area number 2 is not magnetized and the center angle is 7.5 degrees, and the area number 3 is magnetized to be the S-pole and the center angle is 20 degrees.

Another example of the magnetization process of the magnetization apparatus is explained as follows.

FIG. 7a is a table showing another example of the magnetization pattern information. FIG. 7b and FIG. 7c are plan views showing the magnetization area formed by the different process on the basis of the information, respectively.

For specifying arrangement of the magnetization areas, the magnetization pattern information A specifies the area number, the magnetization type (positive direction: N-pole, negative direction: S-pole), the center angle, and the magnetization rate of each magnetization area. In this embodiment, the magnetization rate refers to the rate of the actually magnetized portion in the area and the rest is referred to as the non-magnetization area. For example, the area number 1 is specified by the type of the N-pole, the center angle of 67.5 degrees, and the magnetization rate of 90%. The area number 2 is specified by the type of the S-pole, the center angle of 22.5 degrees, and the magnetization rate of 90%.

The magnet 3 in FIG. 7b, magnetized by the above-mentioned magnetization pattern information, is formed with the area number 1, the area number 2, and the area number 3 in order, from the portion, i.e. a standard point, of the magnet 3 positioned at the gap S of the magnetization yoke 11 at the start of magnetization. For example, the area number 1 has the center angle of 67.5 degrees and 90% on the leading side is magnetized to be the N-pole and the rest 10% is not magnetized. The area number 2 has the center angle of 22.5 degrees and 90% on the leading side is magnetized to be the S-pole and the rest 10% is not magnetized. When the non-magnetization area is determined by the rate, the ratio of the non-magnetization area relative to the magnetization area is easily determined.

The magnet 3 in FIG. 7c, magnetized by the above-mentioned magnetization pattern information, has different pattern of non-magnetization area. The area number 1 has the center angle of 67.5 degrees and 90% at the middle portion is magnetized to be the N-pole and 5% on the leading side and 5% on the end side are not magnetized. The area number 2 has the center angle of 22.5 degrees and 90% at the middle portion is magnetized to be the S-pole and 5% on the leading side and 5% on the end side are not magnetized. The areas allotted with other numbers have the same configuration.

Configuration of the magnetization areas shown either in FIG. 7b or FIG. 7c can be used for the magnetization pattern shown in FIG. 7a. It is necessary that the non-magnetization area is formed at the boundary of the N-poles and the S-poles.

The principle of the magnetic encoder using the magnet magnetized as mentioned above is explained as follows.

Figure 8A:
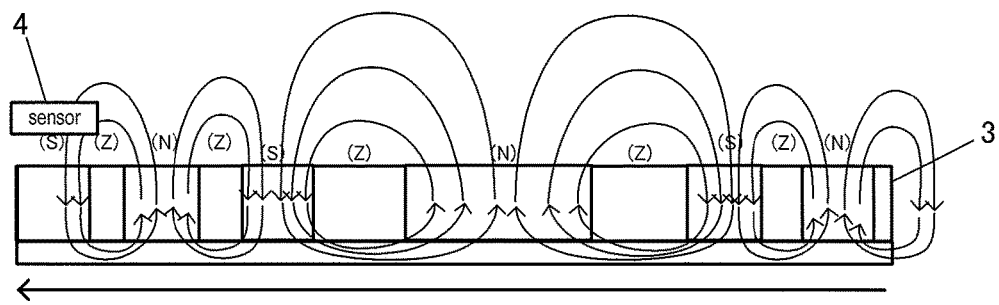
FIG. 8a is a partial side view of the magnetic encoder using the magnet obtained by the magnetization apparatus of FIG. 5.
Figure 8B:
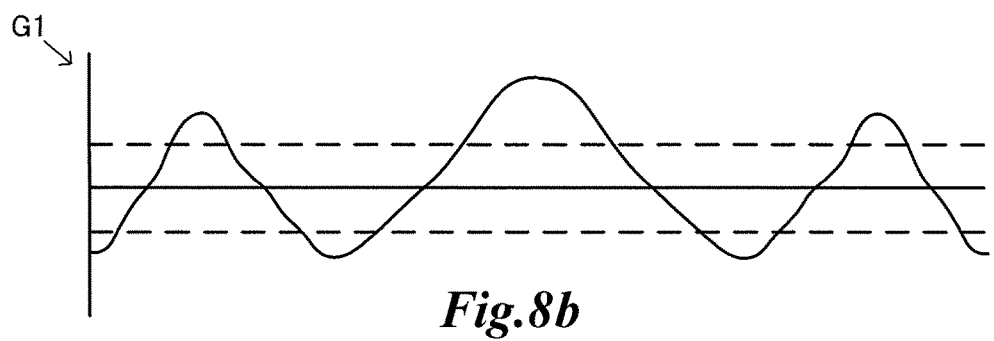
FIG. 8b is a graph showing time change of the detection signal of the magnetic sensor.
Figure 8C:
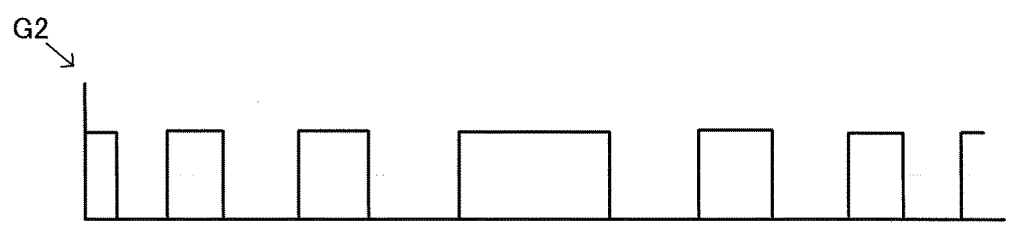
FIG. 8c is a graph in which the detection signal of the magnetic sensor is digitalized.
Figure 10:
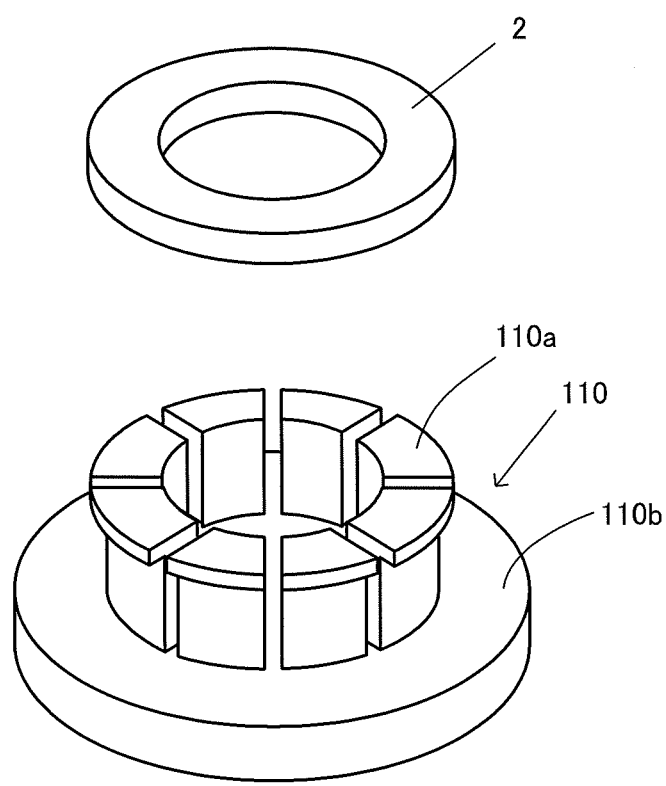
FIG. 10 is a perspective view showing the shape of a conventional multi-pole magnetization yoke.

FIG. 8a is a partial side view of the magnetic encoder comprising the magnet formed with the non-magnetization area and the magnetic sensor, FIG. 8b is a graph showing time change of the detection signal of the magnetic sensor, and FIG. 8c is a graph in which the detection signal of the magnetic sensor is digitalized.

The magnet 3 is annular; however, the magnet is shown linearly in the figure for easy understanding. The magnetic sensor 4 is the same as that shown in FIG. 4a.

As shown in FIG. 8a, the magnet 3 has the non-magnetization area at the boundary of the N-pole and the S-pole, so that the magnetic force lines upwardly penetrating each N-pole of the magnet 3 diverge right and left after rising higher above the surface of the magnet 3 compared with the case of FIG. 4a. The magnetic force lines downwardly penetrating each S-pole are in the same manner.

When the magnet 3 with such a magnetic field moves relative to the magnetic sensor 4, the magnetic sensor 4 outputs a detection signal as shown in the graph G1 of FIG. 8b. The graph G1 is different from the graph in FIG. 4b in that the dip at the center of the peak corresponding to the N-pole in the graph of FIG. 4b is not shown in the graph of FIG. 8b. This is an advantageous effect of providing the non-magnetization area and the above-mentioned problems do not arise even if the magnetic encoder is used under a high temperature condition for a long time. The magnetic force lines go up high without spreading widely, so that the magnetic sensor 4 is able to be provided apart from the magnet 3. Therefore, it is advantageous for the magnetic encoder to prevent damages caused by biting of foreign matters between the magnetic sensor 4 and the magnet 3.

This preferable embodiment is able to provide a magnet capable of generating a desired wave-shape as the detection signal of the magnetic sensor.

In the above-mentioned embodiments, the magnetic member passes through the gap of the magnetization yoke in the form of the letter "C" (referring to FIG. 1, FIG. 2, FIG. 5). Such an idea of magnetizing the magnetic member based on the magnetization pattern information specifying arrangement of desired magnetization areas is applicable to an magnetization apparatus in which the shape of the magnetization yoke and the positional relation of the magnetization yoke with the magnetic member are different. One example is explained hereinafter.

FIG. 9a is a partial side view of the magnetization apparatus in which both end faces of the magnetized yoke are provided on the surface side of the magnetic member, and FIG. 9b is a perspective view of the end faces of the magnetization yoke of the magnetization apparatus. The elements other than the shape of the magnetization yoke are the same as those shown in FIG. 1 and FIG. 2. The magnetization apparatus 1 is able to magnetize the magnetic member 2 based on the magnetization pattern information specifying the arrangement of desired magnetization areas.

The magnetic member 2 may be formed by fixing the hard magnetic ring 2b to the tubular core member 2a made of soft magnetic metal. Namely, the magnetic member 2 is a dual structure of the hard magnetic body and the soft magnetic body. In such a case, the soft magnetic metal of the core member 2a desirably has high magnetic permeability. Thus, the tubular core member 2a effectively fulfills the function of the passage of the magnetic field and prevents extra magnetization other than the objective magnetization area.

In the magnetization yoke 11, the end face 11a facing the magnetic ring 2b can be formed in such a manner that the side along the moving direction of the magnetic body 2 is short. The end face 11b facing the core member 2 can be formed square with four sides longer than the longer side of the end face 11a.

The magnetic member to be magnetized by the magnetization apparatus of the embodiment of the present invention is not limited to be annular and can be oblong. When the magnetic body 2 is oblong, the magnetization apparatus is provided with a linear actuator capable of linearly moving the magnetic member 2 and the magnetization is processed while linearly moving the magnetic body through the gap S of the magnetization yoke 11. Such a magnetization apparatus is able to produce a magnet of a linear encoder. For magnetization of the oblong magnetic member 2, positional information is generated based on the pulse of moving speed of the magnetic member 2 and the pulse of the original signal outputted from the encoder incorporated in the linear actuator, and magnetization process is executed based on the positional information. The positional information can show the portion of the magnetic member 2 passing through the gap S of the magnetization yoke 11 by means of the distance from the leading end of the magnetic member 2.

The method for generating the positional information can be modified as long as the portion of the magnetic member 2 passing through the gap S of the magnetization yoke 11 is specified at the time of magnetization process. For example, a focus point can be set after the magnetic member 2 reaches a constant speed on the route, the sensor is provided at the focus point, time is counted upon detecting that the magnetic member 2 passes through the focus point, and then the portion of the magnetic member 2 passing through the gap S of the magnetization yoke 11 can be specified. The positional information can be shown with the rotary angle or distance of the portion of the magnetic member 2 passing through the gap S of the magnetization yoke 11 from the standard position, the standard position being the portion of the magnetic member 2 having passed through the gap S of the magnetization yoke 11 at the time of starting timekeeping.

The power supply part 14 is not limited to the condenser-type power source. The power supply part 14 is only required to selectively supply positive current or negative current to the coil 13. The power supply part 14 can be constituted such that the power supply circuit 14b is directly connected to the selection switch 14a without providing the condenser 14c and the charge switch 14d.

The plural movable pieces constituting the chuck 10c are not limited to be four. It can be divided into three or more than four.

REFERENCE NUMERAL 1 magnetization apparatus
11 magnetization yoke
13 coil
14 power supply part
15 control part
15c area setting part
15d positional information generation part
2 magnetic member
3 magnet
A magnetization pattern information
S gap

The invention claimed is:

1. A magnetization apparatus for a magnet of a magnetic encoder, the magnetization apparatus being configured to form magnetization areas by moving a magnetic member along a route penetrating a gap of a magnetization yoke while generating positive and negative magnetic fields in the gap of the magnetization yoke, the magnetization apparatus comprising:
 a power supply part configured to supply electric power to a coil wound around the magnetization yoke;
 an area setting part configured to receive magnetization pattern information that respectively specifies arrangement of the magnetization areas relative to the magnetic member, widths of each magnetization area being defined in the magnetization pattern information;
 a positional information generation part configured to output positional information of the magnetic member moving along the route; and a control part configured to control the power supply part in such a manner that each portion of the magnetic member corresponding to the magnetization area specified in the magnetization pattern information receives corresponding positive or negative magnetic field based on the positional information outputted from the positional information generation part.

2. The magnetization apparatus for a magnet of a magnetic encoder as set forth in claim 1, wherein the magnetization pattern information further specifies arrangement of each non-magnetization area in addition to the magnetization areas, width of each non-magnetization area being defined in the magnetization pattern information.

3. The magnetization apparatus for a magnet of a magnetic encoder as set forth in claim 2, wherein the magnetization pattern information specifies arrangement of the magnetization areas, each including the non-magnetization area, and the magnetization pattern information specifies ratio of the non-magnetization area in each magnetization area.

4. The magnetization apparatus for a magnet of a magnetic encoder as set forth in claim 3, wherein the magnetization pattern information specifies the lowest value for the ratio of the non-magnetization area.

5. The magnetization apparatus for a magnet of a magnetic encoder as set forth in claim 1, wherein the control part controls at least one of generation time and strength of the magnetic field in each magnetization area of which arrangement is specified in the magnetization pattern information.

6. The magnetization apparatus for a magnet of a magnetic encoder as set forth in claim 1,
wherein the power supply part supplies positive or negative electric current pulse, and
wherein the control part controls the number of supply times of the electric current pulse per magnetization area specified in the magnetization pattern information.

7. The magnetization apparatus for a magnet of a magnetic encoder as set forth in claim 1, wherein the magnetic member is annular and has a predetermined length in the circumferential direction and movement along the route is rotation with the central axis of the magnetic member fixed.

8. The magnetization apparatus for a magnet of a magnetic encoder as set forth in claim 2, wherein the control part controls at least one of generation time and strength of the magnetic field in each magnetization area of which arrangement is specified in the magnetization pattern information.

9. The magnetization apparatus for a magnet of a magnetic encoder as set forth in claim 2,
wherein the power supply part supplies positive or negative electric current pulse, and
wherein the control part controls the number of supply times of the electric current pulse per magnetization area specified in the magnetization pattern information.

10. The magnetization apparatus for a magnet of a magnetic encoder as set forth in claim 2, wherein the magnetic member is annular and has a predetermined length in the circumferential direction and movement along the route is rotation with the central axis of the magnetic member fixed.

11. The magnetization apparatus for a magnet of a magnetic encoder as set forth in claim 2,
wherein the power supply part is configured to provide a time period without generating a magnetic field, and
wherein the control part controls the power supply part so as to provide the time period without generating a magnetic field corresponding to the width of the non-magnetization area in a case that the width of the non-magnetization area is specified in the magnetization pattern information.

12. The magnetization apparatus for a magnet of a magnetic encoder as set forth in claim 1, wherein the area setting part receives and registers the magnetization pattern information from an external device through a medium.

13. The magnetization apparatus for a magnet of a magnetic encoder as set forth in claim 12, the magnetization pattern information further specifying arrangement of each of non-magnetization areas in addition to the positive and the negative magnetization areas, width of the non-magnetization areas being respectively defined in the magnetization pattern information.

14. The magnetization apparatus for a magnet of a magnetic encoder as set forth in claim 12, wherein the area setting part registers a plurality of magnetization pattern information and selects one of the magnetization pattern information by the external device.

* * * * *